Jan. 16, 1962     J. L. LUMMUS ET AL     3,016,962
AUTOMATIC ACTING HYDROCYCLONES FOR DRILLING FLUIDS
Filed Oct. 9, 1959                          2 Sheets-Sheet 1

INVENTORS
JAMES L. LUMMUS
PLATHO P. SCOTT, JR.
BY
Buell B. Hamilton
ATTORNEY

Jan. 16, 1962 J. L. LUMMUS ET AL 3,016,962
AUTOMATIC ACTING HYDROCYCLONES FOR DRILLING FLUIDS
Filed Oct. 9, 1959 2 Sheets-Sheet 2

INVENTORS
JAMES L. LUMMUS
PLATHO P. SCOTT, JR
BY
ATTORNEY

United States Patent Office 3,016,962
Patented Jan. 16, 1962

3,016,962
AUTOMATIC ACTING HYDROCYCLONES FOR DRILLING FLUIDS
James L. Lummus and Platho P. Scott, Jr., Tulsa, Okla., assignors to Pan American Petroleum Corporation, Tulsa, Okla., a corporation of Delaware
Filed Oct. 9, 1959, Ser. No. 845,414
14 Claims. (Cl. 175—66)

This invention relates to drilling wells. More particularly it relates to the treatment of drilling fluids used in drilling wells.

In our U.S. patent application Serial Number 600,985, now U.S. Patent 2,954,871 issued October 4, 1960, of which this application is a continuation-in-part, the use of hydrocyclones to treat drilling fluids is described. The use of hydrocyclones to remove bit cuttings from drilling fluids has now become common. The principal objection has been that the hydrocyclones reject too much liquid with the bit cuttings. This is particularly true when few bit cuttings are present in the drilling fluid. For example, when drilling a hard formation, the amount of bit cuttings in the drilling fluid may be very small. The hydrocyclone, however, continues to reject an underflow stream just as if the drilling fluid contained a large volume of cuttings. The hydrocyclone can, of course, be shut off at such times but this requires continual supervision of the equipment. Automatic action is obviously desirable.

A hydrocyclone rejects bit cuttings of a smaller size much more effectively than a shale shaker. For this reason, it would be highly desirable to substitute one or more hydrocyclones for the shale shaker. It has been found, however, that if the mud is passed to a hydrocyclone directly from the well, bit cuttings frequently tend to bridge across the apex opening of the cone and thus block operation of the equipment. The difficulty can be avoided by using a larger apex orifice but this increases the problem of drilling fluid loss. Therefore, an apex orifice size larger than ¾-inch in diameter is rarely used. The rate of loss of drilling fluids even with smaller underflow orifices is ordinarily sufficiently great to make frequent bypassing of the hydrocyclones advisable. This results in rapid build-up of solids in the mud pits with consequent need for frequent jetting.

With the above problems in mind, it is an object of the present invention to decrease the loss of drilling fluids from hydrocyclones used to treat the fluids. A more specific object is to substantially avoid rejection of drilling fluid from a hydrocyclone when substantially no bit cuttings are present in the drilling fluid treated by the hydrocyclone. Another object is to provide a hydrocyclone capable of treating drilling fluid with substantially no loss of drilling fluid when substantially no bit cuttings are present. Still another object is to provide a method of drilling a well in which a hydrocyclone can be substituted for the shale shaker without excessive loss of drilling fluid even though the hydrocyclone is not bypassed when few, if any, bit cuttings are present in the drilling fluid.

In general, we have found that we can accomplish the objects of our invention by use of a hydrocyclone having a cone with a large end diameter within a limited range provided the vortex finder diameter is within a very narrow range, the underflow outlet of the cone is also within a very narrow range, the overflow opening from the top of the cone is larger than the vortex finder opening, the inlet opening size is within a narrow range, the input pressure is within a limited range, and the overflow outlet is substantially atmospheric pressure. In applying the hydrocyclone directly to the drilling fluid coming from the well, certain additional provisions must sometimes also be made to insure proper operation of the hydrocyclone.

In some of the literature on hydrocyclones, the terms overflow outlet, orifice or opening, or large end orifice or opening are used interchangeably with the term vortex finder. When used hereinafter, however, the terms overflow or large end outlet or opening will refer only to the outlet from the chamber surrounding the outlet end of the vortex finder or to the conduit leading away from the large end of the hydrocyclone directly if no chamber is used. The term vortex finder will be used whenever the tube extending into the center of the hydrocyclone along its axis is intended. The term underflow outlet or opening will ordinarily be used to indicate the opening at the small end or apex of the cone regardless of the position of the hydrocyclone.

In the drawing, certain additional features are illustrated.

Figure 1:
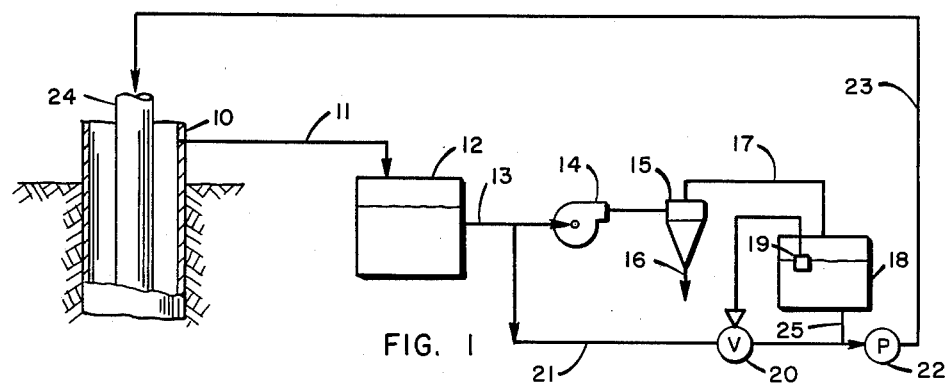
FIGURE 1 shows a flow diagram illustrating one of the simpler applications of our invention in which the hydrocyclone does not take drilling fluid directly from the well.

Hydrocyclones used in the field to decrease the content of bit cuttings and sand in drilling fluids have generally been rather small. They have treated only a portion of the circulated mud stream. We began working with larger hydrocyclones in an effort to adapt them to handle larger volumes of drilling fluid. During this work, an unusually large vortex finder, 4 inches in diameter, was used in a hydrocyclone, 14 inches in diameter, having an overflow opening of 6 inches in diameter. The underflow opening happened to be 1 inch in diameter. The equipment was found to make a good separation of bit cuttings and sand from the drilling fluid. The cuttings and sand were rejected in a concentrated stream from the underflow opening of the cone. On one occasion, flow from the underflow opening stopped as if the opening had been plugged. An investigation, however, showed no plugging. Upon resuming operation of the hydrocyclone, it worked well again rejecting cuttings and sand in an efficient manner. During further work, failure of the hydrocyclone to eject an underflow stream was again noted. Again, no stoppage of the underflow orifice could be found. Finally, it was realized that blocking of the underflow orifice probably was not the reason for failure to eject an underflow stream since the stoppage had occurred when little, if any, bit cuttings and sand were present in the drilling fluid.

Still further work then confirmed that under a very limited set of conditions, the hydrocyclone would efficiently reject bit cuttings and sand in an underflow stream when these contaminants were present in the drilling fluid but would not reject any underflow stream at all when no bit cuttings and sand were present. Upon recognizing this unusual automatic functioning of the hydrocyclone, it occurred to us that it might make possible continuous treatment of the entire mud stream from a well with consequent elimination of the shale shaker and decrease in the loss of drilling fluids from the hydrocyclone.

Still further work showed that the automatic action of the hydrocyclone is dependent on two principal critical factors. These are the vortex finder diameter and the underflow opening diameter. Whether the hydrocyclone itself is large or small, the vortex finder diameter must be within a fixed narrow range. Apparently, the automatic action of the hydrocyclone is dependent upon a certain vortex radius which is controlled by the vortex finder diameter. If the diameter is within the range of 4 to 5 inches, the action is automatic. If the diameter is either larger or smaller, the hydrocyclone rejects an underflow stream whether bit cuttings and sand are present or not. This is equally true for large hydrocyclones and small ones.

The underflow orifice diameter for automatic action is also governed by the size of the vortex in the hydrocyclone. This vortex tapers from a large radius in the large end of the hydrocyclone cone to a small radius at the small end of the cone. If the underflow orifice is no larger than about 1½ inches, nothing comes out of this opening unless bit cuttings or sand are present. Openings down to about ½ inch can be used in some cases if the bit cuttings and sand are small in size. For most drilling operations, however, the diameter should be at least ¾ inch and preferably 1 inch to avoid plugging by large cuttings, pieces of drill pipe protectors, filter cake and the like.

In FIGURE 1, drilling fluid flows from well casing 10 through flow line 11 to storage tank or mud pit 12. Drilling fluid to be circulated to the well is picked up from the mud pit through conduit 13 and a portion is forced by centrifugal pump 14 into hydrocyclone 15 designed and operated in accordance with our invention. Bit cuttings and sand which may be present are rejected through underflow opening 16. If substantially no bit cuttings and sand are present, substantially no underflow stream is rejected. The drilling fluid substantially free from bit cuttings and sand particles flows from the hydrocyclone overflow opening through conduit 17 into a second tank or pit 18. This tank or pit has a level detector 19 which operates a control valve 20 on line 21. Line 21 is a branch of line 13 through which drilling fluid is withdrawn from mud pit 12. Drilling fluid flows through valve 20 to mud pump 22 which pumps it through conduit 23 and a swivel, not shown, into the drill pipe 24 for circulation back down the well. Drilling fluid from tank 18 flows to the intake of pump 22 through line 25.

In operation, as long as hydrocyclone 15 handles the drilling fluid at about the same rate it is circulated in the well, the levels in mud tanks 12 and 18 remain relatively constant, valve 20 remains closed, and pump 22 handles only drilling fluid treated by the hydrocyclone. If at any time, however, the hydrocyclone does not treat sufficient drilling fluid and the level of liquid in tank 18 falls, level detector 19 opens valve 20 and pump 22 obtains a portion of its feed through line 21 directly from tank 12. Detector 19 and control valve 20 may be any of the many electrically or pneumatically operated devices available for this purpose.

The equipment and operation shown in FIGURE 1 and described above fit most closely the field operations in which hydrocyclones are now used. The principal difference lies in the automatic functioning of the hydrocyclone to avoid loss of drilling fluid through underflow opening 16 when little or no bit cuttings and sand are present in the drilling fluid. Continual operation of the hydrocyclone without excessive loss of drilling fluid is therefore possible.

Figure 2:
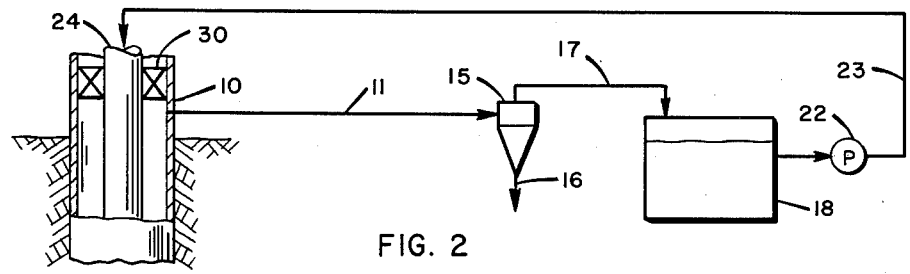
FIGURE 2 shows a simple application of the invention where the hydrocyclone does take drilling fluid directly from the well.

As previously noted, the automatic action of the hydrocyclone to stop ejecting an underflow stream when no bit cuttings or sand are present makes possible tying the hydrocyclone directly into the drilling fluid line from the well. An arrangement of this sort is shown in FIGURE 2. In this case, a pressure seal 30 is placed between casing 10 and drill pipe 24 in the well. This makes possible holding a pressure in the annular space between the casing and drill pipe. The pressure seal may be any of the many now listed in catalogs under titles such as "pressure drilling equipment."

Figure 3:
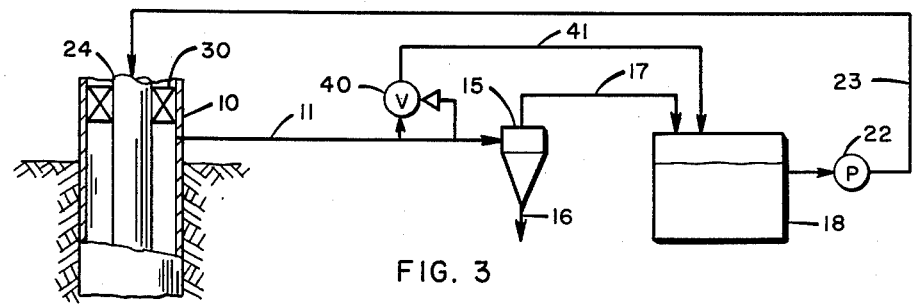
FIGURE 3 illustrates the use of a small hydrocyclone to treat a volume of drilling fluid too large for the hydrocyclone to handle efficiently so a controlled amount of the drilling fluid must bypass the equipment.

For a mud circulating rate of about 11 to 16 barrels per minute, it is only necessary to employ as hydrocyclone 15 one with a cone diameter of about 14 inches having about a 2½ inch inlet opening, and the pressure applied through mud line 11 will be proper to cause the hydrocyclone to operate automatically. If the flow rate is too high for automatic action of the hydrocyclone, the mud pumps 22 can be slowed down, a larger hydrocyclone or several smaller ones in parallel can be used, or part of the drilling fluid stream can be bypassed as shown in FIGURE 3. If the flow rate is too small, the rig mud pumps can be speeded up, a smaller hydrocyclone can be used or the expedient shown in FIGURE 4 can be employed.

Usually, by proper selection of the diameter of the inlet opening of the hydrocyclone and by proper adjustment of the rig mud pump, a single hydrocyclone can be made to operate automatically so that an underflow stream is rejected through underflow opening 16 only when bit cuttings or sand are present in the drilling fluid. The drilling fluid, substantially free from bit cuttings and sand, leaves the overflow opening of the hydrocyclone and flows through mud line 17 to mud pit 18 from which it is picked up by mud pump 22 and circulated back to the well through line 23. Since substantially no cuttings or sand enter mud pit 18, it rarely if ever, needs cleaning.

Although the automatic functioning of hydrocyclones with the consequent improvement in drilling operations and reduction in loss of drilling fluids is substantially independent of the large end diameter of the hydrocyclone cone, there are some limits which must be observed. Obviously, a 5-inch vortex finder cannot be used in a 5-inch diameter hydrocyclone. The large end diameter of the cone should be at least about 6 inches. Preferably, it should be about 8 inches for proper operation of the hydrocyclone. Even an 8-inch hydrocyclone will handle only 7 or 8 barrels of drilling fluids per minute. Higher throughputs result in excessive wear of the hydrocyclone if it is made of the usual materials such as steel, aluminum, brass or the like. Even if these are lined with natural or synthetic rubber, the rate of wear is excessive. Capacities can be increased to some extent by use of very hard materials such as silicon carbide for lining the hydrocyclones. Ordinarily, however, this is not justified.

The 7 or 8 barrels per minute capacity of an 8-inch hydrocyclone is rarely sufficient to handle the entire mud stream from a drilling well. Most such drilling fluid streams at present fall within the 10 to 20 barrels per minute range. This means that either a part of the mud stream must bypass the hydrocyclone or something larger than an 8-inch hydrocyclone must be used. A hydrocyclone with a cone 14 inches in diameter at the large end has been found to perform very well in the 11 to 16 barrels per minute range. This is at present the preferred size for handling the entire drilling fluid stream. It should be noted, however, that 10 barrels per minute of drilling fluid is barely sufficient to cause the 14-inch cyclone to operate automatically. For small flow volumes, therefore, somewhat smaller hydrocyclones should be used. It will be apparent that even larger hydrocyclones up to about 16 inches in diameter can be used to good advantage in some cases to handle very large mud flow rates.

In FIGURE 3, hydrocyclone 15 is too small to operate automatically on the volume of drilling fluid being circulated in the well. Therefore, a portion of the circulating mud stream is directed from flow line 11 through control valve 40 so it bypasses hydrocyclone 15 through line 41 to mud pit 18. Control valve 40 is operated by the pressure at the inlet of the hydrocyclone. Thus, if the volume of flow increases, the pressure at the inlet of the hydrocyclone increases. This opens control valve 40 to bypass a larger amount of drilling fluid around the hydrocyclone so that it continues to operate in the automatic range.

Figure 4:
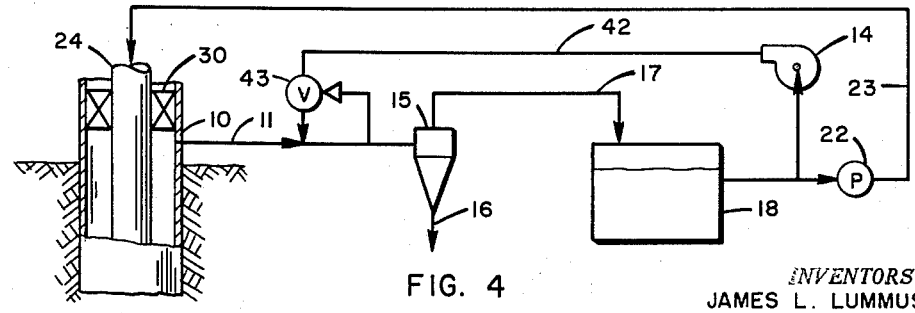
FIGURE 4 illustrates the use of a large hydrocyclone to treat a volume of drilling fluid too small to insure proper functioning of the hydrocyclone so a controlled amount of additional drilling fluid must be supplied.

In FIGURE 4, hydrocyclone 15 is too large to operate automatically on the volume of drilling fluid being circulated in the well. Therefore, an additional quantity of drilling fluid is picked up from mud pit 18 by centrifugal pump 14 which feeds the mud through line 42 and control valve 43 to the inlet of the hydrocyclone. Again, the control valve is operated by the pressure at the inlet of the hydrocyclone. In this case, however, as the pressure rises at the hydrocyclone inlet, the pressure tends to close control valve 43 so that less drilling fluid is fed to the hydrocyclone. As the pressure at the inlet drops, on the other hand, control valve 43 opens to feed a larger volume of drilling fluid to the hydrocyclone.

Hydrocyclones operate automatically over a rather wide range of volume inputs if the vortex finder and underflow opening are in the proper range. Therefore, it is usually not necessary to resort to the expedients shown in FIGURES 3 and 4. The arrangement shown in FIGURE 2 can ordinarily be adjusted to make the hydrocyclone operate automatically and is greatly preferred because of its simplicity.

Most of the hydrocyclones available have an internal cone angle of about 14 degrees. That is, a line along the slope of the cone makes an angle of about 7 degrees with the axis of the cone. Although many other designs are possible, hydrocyclones with an angle of 14 degrees as described above are preferred. The angle should not be smaller than about 70 degrees or larger than about 20 degrees for best automatic operation of the hydrocyclone.

As little back pressure as possible should be imposed on the overflow outlet of the hydrocyclone. A cylindrical chamber may surround the outer end of the vortex finder. This chamber should be of about the same diameter as the large end of the cone of the hydrocyclone. The outlet from this chamber should be attached to the chamber so that it is tangent to the path of rotation of the drilling fluid in the chamber and extends in a direction so the rotating liquids flow towards the tangent opening rather than away from it. The opening should be at least as large as the vortex finder and preferably somewhat larger to insure as much freedom from back pressure as possible. For the same reason, the outlet line should be as short as possible.

When the term "substantially open to atmospheric pressure" is used hereinafter in connection with the overflow outlet, it is intended to mean that large conduits, preferably open, are used or if closed conduits, such as pipes are employed, they should be kept as short as possible to avoid imposing a back pressure of more than 1 or 2 pounds per square inch gage on the overflow outlet.

Figure 5:
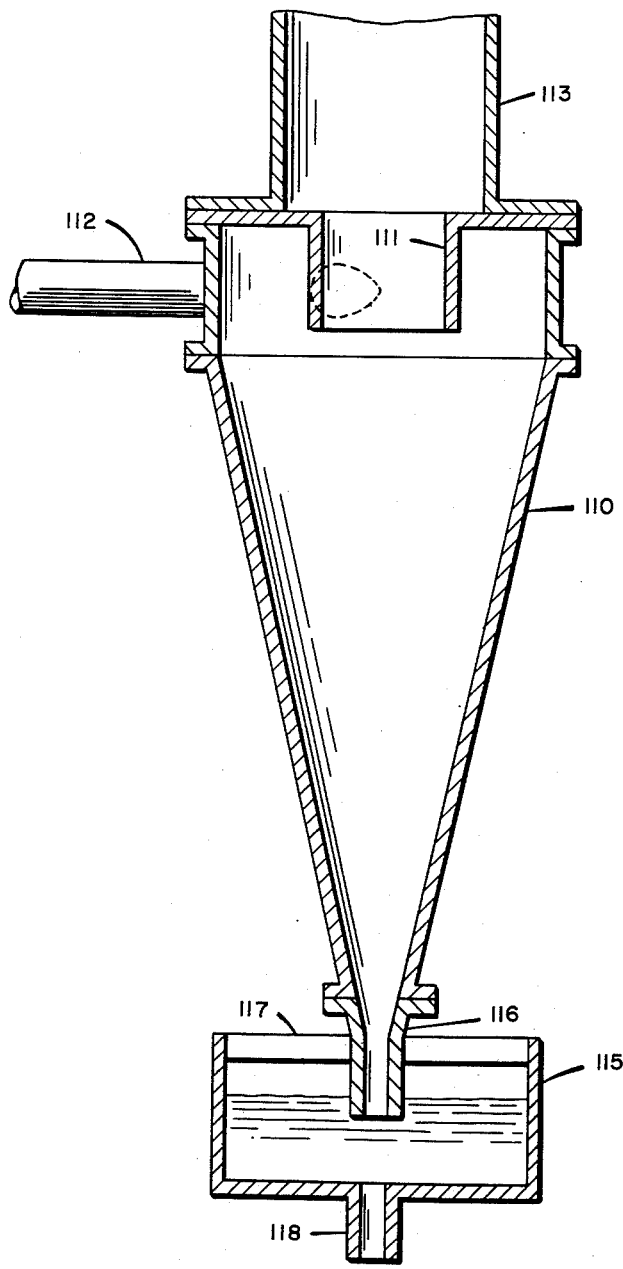
FIGURE 5 shows a hydrocyclone having a special type of attachment to the apex opening of the cone to further decrease loss of drilling fluid.

For best results, no top chamber should be used on the hydrocyclone. Instead, a conduit, as shown in FIGURE 5, should be attached directly to the large end of the hydrocyclone. This conduit should be at least as large as the vortex finder and preferably larger to decrease the back pressure as much as possible. It should be extended in a direction along the axis of the hydrocyclone cone for a distance of at least 2 or 3 feet to avoid disturbing the action of the vortex in the hydrocyclone.

A slight back pressure can be held on the underflow orifice by use of a pot such as that shown in FIGURE 5. In this figure, the cone 110, vortex finder 111, inlet opening 112, and overflow conduit 113 are as previously described. In this case, however, a pot 115 with an open top is suspended around the bottom opening 116 by suitable means such as webs 117. In the bottom of pot 115 is an opening 118 slightly smaller in diameter than opening 116 in the bottom of the hydrocyclone.

When a stream containing sand and bit cuttings flows out of opening 116 into pot 115, the stream runs through opening 118 somewhat more slowly than through opening 116. Therefore, the pot tends to fill until the liquid level reaches the bottom opening 116. When this happens, the slight vacuum in the center of the vortex in the hydrocyclone causes some of the liquid in pot 115 to flow up into opening 116. The liquid drawn up into the hydrocyclone from pot 115 must necessarily contain some bit cuttings and sand. Nevertheless, we have found that the concentration of liquid drilling fluid in the underflow stream is decreased by this technique, thus, still further reducing the loss of liquid while removing a given amount of bit cuttings and sand from the drilling fluid.

The only other pressure involved is the inlet pressure. For any given inlet diameter, the inlet pressure offers a convenient measure of the volume and velocity of drilling fluid entering the hydrocyclone. The volume and velocity are really the variables which must be controlled within certain limits to insure proper operation of the hydrocyclone. It is ordinarily more convenient, however, to specify a range of inlet sizes and a pressure range which will provide volumes and velocities within the desired limits.

In order to provide an adequate volume of flow into the hydrocyclone to form and maintain an effective vortex, the inlet opening diameter should be at least about $\frac{1}{10}$ the diameter of the large end of the hydrocyclone cone. To avoid overloading the hydrocyclone, the inlet opening should be no larger than about $\frac{1}{4}$ the large end of the hydrocyclone cone. To provide an adequate velocity to insure an effective vortex, an inlet pressure of at least about 25 pounds per square inch gage should be used. To avoid excessive wear of the hydrocyclone due to high velocities of liquids and entrained solids, an inlet pressure no higher than about 100 pounds per square inch should be used.

Our invention will be better understood from the following examples:

EXAMPLE I

A hydrocyclone having a cone 14 inches in diameter and about 48 inches long was employed to determine the effects of several variables in the laboratory. The cone was mounted with the axis vertical and with the large end up. The inlet to the hydrocyclone was 2½ inches in diameter and entered a cylindrical portion attached to the top of the cone as shown in FIGURE 5. The vortex finder extended from a flange plate covering the top of the cylindrical portion which carried the inlet. The vortex finder tube extended through this cylindrical portion, the open end being at the level of the top of the cone. Above the vortex finder plate was another flange plate carrying a vertical conduit larger than the vortex finder. The arrangement was essentially as shown in FIGURE 5 of the drawing. The effects of varying the diameters of the vortex finder and underflow opening were investigated. In this work, a drilling fluid was prepared by mixing 4 percent by weight of bentonite into water and then adding treating agents to increase the Marsh funnel viscosity to 73 seconds and the density of 9 pounds per gallon. This mud was fed to the hydrocyclone by means of a centrifugal pump. The procedure was to run drilling fluid substantially free from sand through the hydrocyclone first and determine if an underflow stream was ejected. Sand was then added to the drilling fluid. The sand grains were distributed throughout the range from 4 mesh to about 325 mesh, that is, from those which would barely pass a number 4 U.S. Standard sieve to those which were barely retained on a number of 325 U.S. Standard sieve. The sand-containing drilling fluid was then pumped through the hydrocyclone. Samples of the feed and overflow streams were taken and the sand was removed, dried, and subjected to screen analysis to determine the percentage removal in several size ranges. The results of the tests are reported in Table 1.

Table 1

| Test No. | Diam. of Openings, in. | | | Inlet Pressure, p.s.i.g. | Feed, bbl./min. | Percent Sand Removal | | | | Automatic Operation |
|---|---|---|---|---|---|---|---|---|---|---|
| | Vortex Finder | Under-flow | Over-flow | | | −16 +60 | −60 +100 | −100 +230 | −230 +235 | |
| 1 | 4 | 1 | 6 | 50 | 13.4 | 97 | 95 | 85 | 33 | Yes. |
| 2 | 4 | 1 | 6 | 38 | 10.9 | 100 | 95 | 56 | 0 | Yes. |
| 3 | 4 | 1½ | 6 | 50 | 13.3 | 97 | 97 | 82 | 42 | No. |
| 4 | 5 | 1 | 6 | 45 | 14.0 | 98 | 93 | 42 | | Yes. |
| 5 | 5 | 1 | 6 | 38 | 11.5 | 98 | 90 | 36 | | Yes. |
| 6 | 5 | 1½ | 6 | 45 | 14.0 | 98 | 96 | 63 | | Yes. |
| 7 | 5 | 2 | 6 | 42 | 14.8 | 99 | 97 | 72 | | No. |
| 8 | 6 | 1 | 8 | 42 | 14.8 | 97 | 92 | 39 | | No. |
| 9 | 6 | 1½ | 8 | 42 | 14.8 | 97 | 92 | 41 | | No. |
| 10 | 7 | 1½ | 8 | 42 | 14.8 | 98 | 85 | 36 | | No. |

Tests 1, 2, 4, 5, and 6 show that by use of a vortex finder 4 or 5 inches in diameter and an underflow opening of the proper size, the action of the hydrocyclone can be made automatic, that is, substantially no underflow stream is rejected if substantially no sand is present. Tests 8, 9, and 10 show that when the vortex finder is increased in size to 6 or 7 inches in diameter, the action of the hydrocyclone is upset to such as extent that it will not function automatically. Test 3 is particularly significant in considering the minimum size of vortex finder which should be used. It will be noted in this test that the action was not completely automatic when an underflow opening of 1½ inches was used. In later tests reported in Table 2, however, it was possible to make the hydrocyclone operate automatically with a 1½-inch underflow opening and a 4-inch vortex finder. It is apparent that 1½ inches is the maximum which can be used with a 4-inch vortex finder and even then the results are somewhat erratic. If the vortex finder diameter is further decreased to 3 inches, a size more commonly used with both 14-inch and 8-inch hydrocyclones, previous experience shows that the action of the hydrocyclone can be made automatic only under very unusual circumstances, if at all.

In all cases the hydrocyclone removed all sand particles larger than 16 mesh and almost all of those in the 16 to 60 mesh range. In all cases at least 85 percent of particles in the 60 to 100 mesh range were removed regardless of whether the operation was automatic or not. There was considerable variation in the removal of particles in the 100 to 230 mesh range. Here again, the degree of removal seems to have little or no relation to whether the operation of the hydrocyclone was automatic or not. Unfortunately, the centrifugal pump employed had a limited capacity so flow rates above about 14 barrels per minute could not be investigated. It will be apparent, however, that flow rates as low as 10.9 barrels per minute caused automatic operation of the hydrocyclone. In a subsequent test in which about 9 barrels per minute were circulated through a well and the 14-inch hydrocyclone, the action was almost, but not quite, automatic. The inlet pressure in this case was about 25 pounds per square inch gage outside a 2½-inch inlet opening. The inlet pressure range should be maintained between limits of about 30 and about 100 pounds per square inch gage.

In connection with the data on the size of particles which the hydrocyclones will remove from drilling fluids, it will be apparent that when reference is made to a drilling fluid "substantially free from large bit cuttings" or "substantially free from bit cuttings," the bit cuttings to which reference is made are those larger than 100 mesh size which the hydrocyclone effectively removes from the drilling fluid. The drilling fluid can contain up to about 1 pound per barrel of particles in the 100 to 230 mesh range and still be considered substantially free from bit cuttings. A small stream up to about one-half gallon per minute or so, containing a portion of such particles, may be rejected from the underflow outlet of the hydrocyclone. When reference is made to there being substantially no underflow stream when substantially no bit cuttings are present in the drilling fluid, it will be understood that the language is intended to cover this type of marginal case as well as the more-cut operation when only larger size particles are involved.

EXAMPLE II

Tests were conducted as described in Example I except that in some cases a pot such as that shown in FIGURE 5 of the drawing was placed on the underflow opening of the 14-inch hydrocyclone. Table 2 reports the results of the tests using the pot. These are compared to similar tests in which no pot was used. In all cases the vortex finder was 4 inches in diameter.

Table 2

| Test No. | Diameters, in. | | Inlet Press., p.s.i.g. | Feed, bbl./min. | Percent Sand Removed | | | | Underflow Volume, gal./min. | Automatic Operation |
|---|---|---|---|---|---|---|---|---|---|---|
| | Under-flow | Pot | | | −16 +60 | −60 +100 | −100 +230 | −230 +325 | | |
| 1 | 1 | (¹) | 50 | 13.4 | 97 | 95 | 85 | 33 | 9.1 | Yes. |
| 2 | 1 | ¾ | 50 | 14.2 | 100 | 99 | 90 | 64 | 6.0 | Yes. |
| 3 | 1 | (¹) | 38 | 10.9 | 100 | 95 | 56 | 0 | 5.4 | Yes. |
| 4 | 1 | 1½ | 38 | 11.5 | 96 | 97 | 61 | 17 | 5.7 | Yes. |
| 5 | 1½ | (¹) | 50 | 13.3 | 97 | 97 | 82 | 42 | 16.6 | No. |
| 6 | 1½ | 1 | 50 | 13.3 | 100 | 97 | 74 | 31 | 10.0 | Yes. |
| 7 | 1½ | 1 | 38 | 11.4 | 100 | 94 | 54 | 0 | 6.0 | No. |

¹ No Pot.

A comparison of the results of tests 1 and 2 shows that when sand was present causing rejection of an underflow stream the pot decreased the rate of flow of the rejected stream from about 9 to about 6 gallons per minute. This did not adversely affect the removal of sand from the overflow stream. A comparison of tests 5 and 6 shows about the same effect. In the operation of the hydrocyclone at lower pressure as reported in test 7, however, it will be noted that the reduction in the volume of the underflow stream was obtained at the expense of some loss in efficiency of removal of sand. Substantially all the sand larger than 100 mesh in size was removed even in this case, however. The pot used in test 4 provided no improvement over the results obtained when no pot was used. This was apparently due to the use of a larger opening in the pot than in the hydrocyclone. It was thought that the volume of fluid ejected from the underflow opening of the hydrocyclone under pressure might be sufficiently large that a pot opening slightly larger than that of the hydrocyclone might not handle the entire flow and thus might produce some beneficial effect. This did not turn out to be true, however. It is apparent that the pot opening should be no larger than the hydrocyclone underflow opening and preferably should be somewhat smaller. Tests 5, 6 and 7 are the one referred to in connection with Example I to show the erratic automatic action of the hydrocyclone using a 4-inch vortex finder and 1½-inch underflow opening. It will be apparent that 1½ inches is the upper limit of diameter for the underflow opening if automatic action of the hydrocyclone is to be obtained.

EXAMPLE III

Tests as described in Example I were repeated using a hydrocyclone 8 inches in diameter to check the operability of the 4-inch and 5-inch vortex finders in this smaller hydrocyclone. In all cases the underflow opening was 1 inch in diameter and the overflow opening was 6 inches in diameter. Use of the smaller hydrocyclone with the available centrifugal pump also provided an opportunity to check the operation at higher inlet pressures. Results of these tests are presented in Table 3.

*Table 3*

| Test No. | Diameter, in. | | Inlet Press., p.s.i.g. | Feed bbl./ min. | Percent Sand Removed | | | | Automatic Operation |
|---|---|---|---|---|---|---|---|---|---|
| | Vortex Finder | Feed Opening | | | −16 +60 | −60 +100 | −100 +230 | −230 +325 | |
| 1 | 4 | 1 | 76 | 5.0 | 100 | 99 | 79 | 30 | Yes. |
| 2 | 4 | 1 | 60 | 3.7 | 100 | 99 | 70 | 23 | Yes. |
| 3 | 4 | 1½ | 77 | 7.0 | 99 | 96 | 88 | 27 | Yes. |
| 4 | 4 | 1½ | 68 | 6.5 | 100 | 99 | 84 | 34 | Yes. |
| 5 | 4 | 1½ | 60 | 5.9 | 100 | 99 | 88 | 27 | Yes. |
| 6 | 4 | 1½ | 47 | 5.3 | 100 | 99 | 74 | 24 | Yes. |
| 7 | 5 | 1 | 78 | 5.1 | 100 | 91 | 23 | 10 | Yes. |
| 8 | 5 | 1 | 78 | 5.1 | 100 | 92 | 64 | 60 | No.[1] |
| 9 | 5 | 1 | 60 | 3.8 | 100 | 82 | 18 | 9 | Yes. |
| 10 | 5 | 1 | 50 | 3.4 | 100 | 85 | 22 | 14 | Yes. |
| 11 | 5 | 1½ | 74 | 7.0 | 99 | 85 | 41 | 23 | Yes. |
| 12 | 5 | 1½ | 74 | 7.0 | 98 | 92 | 88 | 64 | No.[1] |
| 13 | 5 | 1½ | 60 | 5.9 | 100 | 83 | 60 | 23 | Yes. |
| 14 | 5 | 1½ | 50 | 5.5 | 100 | 87 | 47 | 27 | Yes. |

[1] Three pounds per square inch gage applied to the overflow.

It will be apparent that good sand removal was obtained and automatic operation of the 8-inch hydrocyclone occurred as long as the vortex finder underflow opening, feed opening, and inlet pressure were within the proper limits and no back pressure was imposed on the overflow. This is in spite of the vortex finder and overflow openings both being larger than ordinarily considered operable in such a small hydrocyclone. When a little back pressure was applied to the overflow opening, as described in tests 8 and 12, the automatic operation of the hydrocyclone was lost even though the back pressure amounted to only 3 pounds per square inch gage. A considerable underflow stream was rejected in these tests even though substantially no sand was present in the drilling fluid.

We claim:
1. In the process of treating a drilling fluid with a hydrocyclone in which bit cuttings are withdrawn from the underflow opening and a major portion of the drilling fluid substantially free from large cuttings is withdrawn from the overflow outlet, the improvement to cause said hydrocyclone to reject an underflow stream only when bit cuttings retainable on a number 100 U.S. Standard sieve are present in said drilling fluid, comprising passing the drilling fluid to a hydrocyclone having a cone with a large end diameter of from about 8 to about 16 inches, a vortex finder having a diameter of from about 4 to about 5 inches, an underflow opening of from about ½ to about 1¼ inches, an overflow outlet at least as large as the vortex finder, and an inlet opening from about 1/10 to about ¼ the large end diameter of the hydrocyclone cone, while maintaining said overflow outlet substantially open to atmospheric pressure, and maintaining an inlet pressure between about 30 and about 100 pounds per square inch gage.

2. The method of claim 1 in which said hydrocyclone has a cone having a maximum diameter of about 14 inches, a length of about 48 inches, and an underflow outlet of about 1 inch in diameter.

3. The method of claim 1 in which said hydrocyclone is operated with the axis of the cone substantially vertical and in which said hydrocyclone has a pot with an open top attached to the underflow outlet of said hydrocyclone, said pot having a bottom opening smaller than the underflow opening of said hydrocyclone.

4. In the process of drilling a well in which a drill bit is rotated on the bottom of the hole by means of a hollow drill string through which a drilling fluid is circulated in the well to remove bit cuttings, the improvement comprising placing a pressure seal between said hollow drill string and the wall of said well near the top of said well, withdrawing a drilling fluid stream from the annular space between said drill string and the wall of said well and below said pressure seal, passing said drilling fluid stream through a closed conduit directly to a hydrocyclone having a cone with a large end diameter of from about 8 to about 16 inches, a vortex finder having a diameter of from about 4 to about 5 inches, an underflow opening of from about ½ to about 1¼ inches, an overflow outlet at least as large as the vortex finder, and an inlet opening from about 1/10 to about ¼ the large end diameter of the hydrocyclone cone, while maintaining said overflow outlet substantially open to atmospheric pressure, and maintaining the pressure in said conduit between about 30 and about 100 pounds per square inch gage whereby a stream containing bit cuttings is automatically rejected from said underflow outlet when bit cuttings retainable on a number 100 U.S. Standard sieve are present in said drilling fluid, but substantially no underflow stream is rejected when substantially no bit cuttings retainable on a number 100 U.S. Standard sieve are present in said drilling fluid.

5. The method of claim 4 in which said hydrocyclone has a cone having a maximum diameter of about 14 inches, a length of about 48 inches and an underflow outlet of about 1 inch in diameter.

6. The method of claim 4 in which said hydrocyclone is operated with the axis of the cone substantially vertical and in which said hydrocyclone has a pot with an open top attached to the underflow outlet of said hydrocyclone, said pot having a bottom opening smaller than the underflow opening of said hydrocyclone.

7. In the process of drilling a well in which a drill bit is rotated on the bottom of the hole by means of a hollow drill string through which a drilling fluid is circulated in the well to remove bit cuttings, the improvement comprising placing a pressure seal between said hollow drill string and the wall of said well near the top of said well, withdrawing a drilling fluid stream from the annular space between said drill string and the wall of said well and below said pressure seal, passing said drilling fluid stream through a closed conduit directly to a hydrocyclone having a cone with a large end diameter of from about 8 to about 16 inches, a vortex finder having a diameter of from about 4 to about 5 inches, an underflow opening of from about ½ to about 1¼ inches, an overflow outlet at least as large as the vortex finder, and an inlet opening from about $\frac{1}{10}$ to about ¼ the large end diameter of the hydrocyclone cone, while maintaining said overflow outlet substantially open to atmospheric pressure, and withdrawing from said conduit a stream of drilling fluid sufficient to maintain the pressure in said conduit between about 30 and about 100 pounds per square inch gage, whereby a stream containing bit cuttings is automatically rejected from said underflow outlet when bit cuttings retainable on a number 100 U.S. Standard sieve are present in said drilling fluid, but substantially no underflow stream is rejected when substantially no bit cuttings retainable on a number 100 U.S. Standard sieve are present in said drilling fluid.

8. The method of claim 7 in which said hydrocyclone has a cone having a maximum diameter of about 14 inches, a length of about 48 inches and an underflow outlet of about 1 inch in diameter.

9. The method of claim 7 in which said hydrocyclone is operated with the axis of the cone substantially vertical and in which said hydrocyclone has a pot with an open top attached to the underflow outlet of said hydrocyclone, said pot having a bottom opening smaller than the underflow opening of said hydrocyclone.

10. In the process of drilling a well in which a drill bit is rotated on the bottom of the hole by means of a hollow drill string through which a drilling fluid is circulated in the well to remove bit cuttings, the improvement comprising placing a pressure seal between said hollow drill string and the wall of said well near the top of said well, withdrawing a drilling fluid stream from the annular space between said drill string and the wall of said well and below said pressure seal, passing said drilling fluid stream through a closed conduit directly to a hydrocyclone having a cone with a large end diameter of from about 8 to about 16 inches, a vortex finder having a diameter of from about 4 to about 5 inches, an underflow opening of from about ½ to about 1¼ inches, an overflow outlet at least as large as the vortex finder, and an inlet opening from about $\frac{1}{10}$ to about ¼ the large end diameter of the hydrocyclone cone, while maintaining said overflow outlet substantially open to atmospheric pressure, and adding to said conduit a second stream of drilling fluid sufficient to maintain the pressure in said conduit between about 30 and about 100 pounds per square inch gage whereby a stream containing bit cuttings is automatically rejected from said underflow outlet when bit cuttings retainable on a number 100 U.S. Standard sieve are present in said drilling fluid, but substantially no underflow stream is rejected when substantially no bit cuttings retainable on a number 100 U.S. Standard sieve are present in said drilling fluid.

11. The method of claim 10 in which said hydrocyclone has a cone having a maximum diameter of about 14 inches, a length of about 48 inches and an underflow outlet of about 1 inch in diameter.

12. The method of claim 10 in which said hydrocyclone is operated with the axis of the cone substantially vertical and in which said hydrocyclone has a pot with an open top attached to the underflow outlet of said hydrocyclone, said pot having a bottom opening smaller than the underflow opening of said hydrocyclone.

13. In the process of treating a drilling fluid with a hydrocyclone in which bit cuttings are withdrawn from the underflow opening and a major portion of the drilling fluid substantially free from large cuttings is withdrawn from the overflow outlet, the improvement to cause said hydrocyclone to reject an underflow stream only when bit cuttings retainable on a number 100 U.S. Standard sieve are present in said drilling fluid, comprising passing the drilling fluid to a hydrocyclone having a cone with a large end diameter of from about 8 to about 16 inches, a vortex finder having a diameter of about 5 inches, an underflow opening of from about ½ to about 1½ inches, an overflow outlet at least as large as the vortex finder, and an inlet opening from about $\frac{1}{10}$ to about ¼ the large end diameter of the hydrocyclone cone, while maintaining said overflow outlet substantially open to atmospheric pressure, and maintaining an inlet pressure between about 30 and about 100 pounds per square inch gage.

14. In the process of treating a drilling fluid with a hydrocyclone in which bit cuttings are withdrawn from the underflow opening and a major portion of the drilling fluid substantially free from large cuttings is withdrawn from the overflow outlet, the improvement to cause said hydrocyclone to reject an underflow stream only when bit cuttings retainable on a number 100 U.S. Standard sieve are present in said drilling fluid, comprising passing the drilling fluid to a hydrocyclone having a cone with a large end diameter of from about 8 to about 16 inches, a vortex finder having a diameter of from about 4 to about 5 inches, an underflow opening of from about ½ to about 1½ inches, an overflow outlet at least as large as the vortex finder, and an inlet opening from about $\frac{1}{10}$ to about ¼ the large end diameter of the hydrocyclone cone, while maintaining said overflow outlet substantially open to atmospheric pressure, and maintaining an inlet pressure between about 50 and about 100 pounds per square inch gage.

References Cited in the file of this patent

UNITED STATES PATENTS

| | | |
|---|---|---|
| 2,756,878 | Herkenhoff | July 31, 1956 |
| 2,835,387 | Fontein | May 20, 1958 |

UNITED STATES PATENT OFFICE
CERTIFICATE OF CORRECTION

Patent No. 3,016,962 January 16, 1962

James L. Lummus et al.

It is hereby certified that error appears in the above numbered patent requiring correction and that the said Letters Patent should read as corrected below.

Column 5, line 35, for "70" read -- 10 --; column 6, line 60, for "of" read -- to --; line 69, strike out "of"; column 7, line 24, for "as" read -- an --; column 8, line 36, for "more-cut" read -- more clear-cut --; column 9, line 12, for "one" read -- ones --.

Signed and sealed this 29th day of May 1962.

(SEAL)
Attest:

ERNEST W. SWIDER
Attesting Officer

DAVID L. LADD
Commissioner of Patents